United States Patent [19]

Ovshinsky et al.

[11] Patent Number: 6,017,655
[45] Date of Patent: Jan. 25, 2000

[54] NICKEL HYDROXIDE POSITIVE ELECTRODE MATERIAL EXHIBITING IMPROVED CONDUCTIVITY AND ENGINEERED ACTIVATION ENERGY

[75] Inventors: Stanford R. Ovshinsky, Bloomfield Hills; Srinivasan Venkatesan, Southfield; Boyko Aladjov, Rochester Hills; Subhash Dhar, Bloomfield Hills; Rosa Young, Troy, all of Mich.

[73] Assignee: Ovonic Battery Company, Troy, Mich.

[21] Appl. No.: 09/136,129

[22] Filed: Aug. 18, 1998

[51] Int. Cl.⁷ .............................. H01M 4/32; H01M 4/62

[52] U.S. Cl. ............................................ 429/232; 429/223

[58] Field of Search ..................................... 429/223, 232, 429/231.3

[56] References Cited

FOREIGN PATENT DOCUMENTS

10 -326616  12/1998  Japan .
11-238507   8/1999   Japan .
11-260359   9/1999   Japan .

*Primary Examiner*—Maria Nuzzolillo
*Assistant Examiner*—Carol Chaney
*Attorney, Agent, or Firm*—Philip H. Schlazer; Marvin S. Siskind; David W. Schumaker

[57] ABSTRACT

A positive electrode active material mixture comprising: a nickel hydroxide material, and an additive material comprising at least one element selected from the group consisting of calcium cobalt oxide, calcium titanium oxide, calcium molybdenum oxide, lithium cobalt oxide, and mixtures thereof. A nickel positive electrode comprising this active material mixture. A nickel-based, alkaline electrochemical cell comprising this positive electrode.

26 Claims, No Drawings

NICKEL HYDROXIDE POSITIVE ELECTRODE MATERIAL EXHIBITING IMPROVED CONDUCTIVITY AND ENGINEERED ACTIVATION ENERGY

FIELD OF THE INVENTION

The present invention relates to an active material for a nickel positive electrode, a nickel positive electrode using the active material, and to an alkaline electrochemical cell using the nickel positive electrode.

BACKGROUND OF THE INVENTION

The recent trend for portable electronic apparatus has increased the requirement for high energy density rechargeable batteries. High energy density is also important for batteries used for electric vehicles.

Nickel hydroxide has been used for years as an active material for the positive electrode of alkaline batteries. Examples of such nickel-based alkaline batteries include nickel cadmium (Ni—Cd) batteries and nickel-metal hydride (Ni—MH) batteries.

In a NiCd cell, cadmium metal is the active material in the negative electrode. NiCd cells use a positive electrode of nickel hydroxide material. The negative and positive electrodes are spaced apart in the alkaline electrolyte. The charge/discharge reactions at the negative electrode are controlled by the following reaction:

$$Cd(OH)_2 + 2e^- \underset{discharge}{\overset{charge}{\rightleftarrows}} Cd + 2OH^- \tag{1}$$

During charge, electrons are supplied to the negative electrode, whereby $Cd(OH)_2$ is reduced to Cd. During discharge, Cd is oxidized to $Cd(OH)_2$ and electrons are released.

The reactions that take place at the positive electrode of a Ni—Cd cell are also reversible. For example, the reactions at a nickel hydroxide positive electrode in a nickel cadmium cell are:

$$Ni(OH)_2 + OH^- \underset{discharge}{\overset{charge}{\rightleftarrows}} NiOOH + H_2O + e^- \tag{2}$$

At the positive electrode, $Ni(OH)_2$ is oxidized to NiOOH during the charge operation. During discharge, the NiOOH is reduced to $Ni(OH)_2$.

In general, Ni—MH cells utilize a negative electrode that is capable of the reversible electrochemical storage of hydrogen, and a positive electrode of nickel hydroxide material. The negative and positive electrodes are spaced apart in the alkaline electrolyte.

Upon application of an electrical potential across a Ni—MH cell, the Ni—MH material of the negative electrode is charged by the electrochemical absorption of hydrogen and the electrochemical generation of hydroxyl ions:

$$M + H_2O + e^- \underset{discharge}{\overset{charge}{\rightleftarrows}} MH + OH^- \tag{3}$$

The negative electrode reactions are reversible. Upon discharge, the stored hydrogen is released to form a water molecule and evolve an electron.

The reactions that take place at the nickel hydroxide positive electrode of a Ni—MH cell are the same as for a NiCd cell:

$$Ni(OH)_2 + OH^- \underset{discharge}{\overset{charge}{\rightleftarrows}} NiOOH + H_2O + e^- \tag{5}$$

Hence, the charging process for a nickel hydroxide positive electrode in an alkaline storage battery is governed by the following equation:

$$Ni(OH)_2 + OH^- \overset{charge}{\longrightarrow} NiOOH + H_2O + e^- \tag{6}$$

The charging efficiency of the positive electrode and the utilization of the positive electrode material is effected by the oxygen evolution process which is controlled by the reaction:

$$2OH^- \longrightarrow H_2O + 1/2\, O_2 + 2e^- \tag{7}$$

During the charging process, a portion of the current applied to the battery for the purpose of charging, is instead consumed by the oxygen evolution reaction (7). The oxygen evolution of equation (7) is not desirable and contributes to lower utilization rates of the positive active material upon charging. One reason both reactions occur is that their electrochemical potential values are very close. Anything that can be done to widen the gap between them, lowering the nickel electrochemical potential in reaction (6) or raising the electrochemical potential of the oxygen evolution reaction (7), will contribute to higher utilization rates. It is noted that the electrochemical potential of the oxygen evolution reaction (7) is also referred to as the oxygen evolution potential.

Furthermore, the electrochemical potential of reaction (7) is more temperature dependent than that of reaction (6). At lower temperatures, oxygen evolution is low and the charging efficiency is high. However, at higher temperatures, the electrochemical potential of reaction (7) decreases and the rate of the oxygen evolution reaction (7) increases so that the charging efficiency of the nickel hydroxide positive electrode drops. High temperatures at the positive electrodes may be due to the external environment at which the battery is operated. They may also be due to the heat generated within the battery by oxygen gas recombination at the negative electrodes.

One way to increase the electrochemical potential of equation (7) is by mixing certain additives with the nickel hydroxide active material when forming the positive electrode paste. U.S. Pat. No. 5,466,543 to Ikoma, and U.S. Pat. Nos. 5,571,636 and 5,451,475 to Ohta et al discloses certain additives which improve the rate of utilization of the nickel hydroxide in a wide temperature range. The present invention discloses new additives which improve the high temperature utilization of nickel-based positive electrodes.

SUMMARY OF THE INVENTION

An objective of the present invention is an positive electrode active material mixture, a nickel positive electrode, and an alkaline electrochemical cell having high-temperature capacity and utilization.

This and other objectives are satisfied by a positive electrode active material mixture for use in a paste for fabricating positive electrodes, comprising: a nickel hydroxide material; and an additive material comprising at least one element selected from the group consisting of calcium cobalt oxide, calcium titanium oxide, calcium molybdenum oxide, lithium cobalt oxide, and mixtures thereof.

This and other objectives are also satisfied by a nickel positive electrode for use in an alkaline electrochemical cell, comprising: an active material mixture comprising: a nickel hydroxide material; and an additive material comprising at least one element selected from the group consisting of calcium cobalt oxide, calcium titanium oxide, calcium molybdenum oxide, lithium cobalt oxide, and mixtures thereof.

This and other objectives are satisfied by an alkaline electrochemical cell, comprising: at least one positive electrode; at least one negative electrode; and electrolyte; where the positive electrode comprises an active material mixture comprising: a nickel hydroxide material; and an additive material comprising at least one element selected from the group consisting of calcium cobalt oxide, calcium titanium oxide, calcium molybdenum oxide, lithium cobalt oxide, and mixtures thereof.

DETAILED DESCRIPTION OF THE INVENTION

Disclosed herein is a positive electrode active material mixture for use in a paste for fabricating positive electrodes. The active material mixture comprises a nickel hydroxide material and an additive material. The additive material is one or more materials selected from the group consisting of calcium cobalt oxide, calcium titanium oxide, calcium molybdenum oxide, and lithium cobalt oxide. Mixtures of calcium cobalt oxide, calcium titanium oxide, calcium molybdenum oxide, and lithium cobalt oxide may also be used. In a first embodiment, the additive is calcium cobalt oxide. In a second embodiment, the additive is calcium titanium oxide. In a third embodiment the additive is calcium molybdenum oxide. In a fourth embodiment, the additive is lithium cobalt oxide. Preferably, the additive is calcium molybdenum oxide.

Preferably, the additive is between about 1% and 10% by weight of the positive electrode material. More preferably, the additive is between about 2% and 6% by weight of the positive electrode material. Most preferably, the additive is about 3% by weight of the positive electrode material.

The nickel hydroxide material may be any nickel hydroxide material known in the art. It is within the spirit and intent of this invention that any and all kinds of nickel hyroxide materials may be used. Examples of possible nickel hydroxide materials are provided in U.S. Pat. Nos. 5,348,822 and 5,637,423, the contents of which are incorporated by reference herein.

Also disclosed herein is a nickel positive electrode for use in an alkaline electrochemical cell. The nickel positive electrode comprises the active material mixture described above. An electrically conductive substrate is used as a support for the active material. The additive materials are mixed with the nickel hydroxide material. Preferably, a binder, such as polyvinyl alcohol, is also added to the mixture to form a paste. The paste is affixed to the electrically conductive substrate to form an electrode.

The electrically conductive substrate may be any electrically conductive support, known in the art, capable of holding the positive electrode material. It is within the spirit and intent of this invention that any and all kinds of electrically conductive subtrates may be used. Examples of substrates include foam, perforated metal, expanded metal, screen, and matte. Preferably the substrate is a metal foam. Generally, any metal may be used as long as it is immune from corrosion at the pH and potential of the positive electrode. Examples include a metal foam comprising nickel, nickel alloy, nickel plated steel, and nickel plated copper. Preferably, the metal foam comprises nickel or a nickel alloy.

The additive material serves to increase the electrochemical potential of the oxygen evolution reaction (7) at high temperatures. As a result, the charging reaction of nickel hydroxide to nickel oxyhydroxide expressed as reaction formula (6) sufficiently proceeds to improve the utilization of the nickel positive electrode in the high-temperature atmosphere.

The nickel positive electrode of the present invention may be used in any nickel-based, alkaline electrochemical cell. In general, an electrochemical cell comprises at least one nickel positive electrode, at least one negative electrode, and an electrolyte surrounding the positive and negative electrodes. The electrolyte is an alkaline electrolyte which may comprise a potassium hydroxide solution.

Examples of nickel-based electrochemical cells include nickel-metal hydride, nickel-cadmium, nickel-zinc, and nickel-hydrogen electrochemical cells. The nickel-cadmium electrochemical cell uses cadmium negative electrodes comprising a cadmium active material. The nickel-metal hydride electrochemical cell uses a metal hydride negative electrode comprising a metal hydride active material.

The metal hydride negative electrode comprises metal hydride material affixed to an electrically conductive substrate. It is within the spirit and intent of this invention that any and all kinds of metal hydride materials may be used. Examples of metal hydride materials are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen.

Further metal hydride materials are described in U.S. Pat. No. 4,728,586 ("the '586 Patent") to Venkatesan, Reichman, and Fetcenko, the disclosure of which is incorporated by reference. The '586 Patent describes a specific sub-class of Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other examples of metal hydride materials are provided in U.S. Pat. No. 5,536,591, the disclosure of which is incorporated by reference herein.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

EXAMPLE

A "standard" positive electrode paste was formed from about 88.6% active nickel hydroxide material, about 5% by weight of cobalt, about 6% by weight of cobalt oxide, and about 0.4% by weight of polyvinyl alcohol binder. The paste was affixed to a nickel foam substrate to form a "standard" positive electrode.

Four additional positive electrode pastes were formed by replacing about 3% by weight of the nickel hydroxide material with the additives (1) calcium cobalt oxide, (2) calcium titanium oxide, (3) calcium molybdenum oxide, and (4) lithium cobalt oxide respectively. The pastes were applied to nickel form substrates to form (1) calcium cobalt oxide, (2) calcium titanium oxide, (3) calcium molybdenum oxide, and (4) lithium cobalt oxide positive electrodes.

The standard positive electrode as well as the four additional electrodes made from the new active materials were all tested using the tri-electrode test technique. A small tri-electrode cell for testing electrodes was designed. The cell was fabricated by positioning a positive electrode between two negatives in the presence of excess electrolyte. The three electrode system was held in place by two plexiglass plates. The negative electrode used for the test was a nickel-metal hydride electrode. After initial formation, charges were done at C/10 to 120% charge. The discharges are done at C/10 until cutoff voltage of 0.9 volts. The capacity of each electrode was measured at 22° C. and at 45° C. The percentage decrease in capacity is shown in the Table.

TABLE

| ADDITIVE | % DECREASE IN CAPACITY (22° C. TO 45° C.) |
|---|---|
| standard | 10.6% |
| calcium cobalt oxide | 7.5% |
| calcium titanium oxide | 5.9% |
| calcium molybdenum oxide | 2.5% |
| lithium cobalt oxide | 8.7% |

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A positive electrode active material mixture for use in a paste for fabricating positive electrodes, comprising:
   a nickel hydroxide material; and
   an additive material comprising at least one compound selected from the group consisting of calcium cobalt oxide, calcium titanium oxide, calcium molybdenum oxide, lithium cobalt oxide, and mixtures thereof.

2. The active material mixture of claim 1, wherein said additive material comprises calcium cobalt oxide.

3. The active material mixture of claim 1, wherein said additive material comprises calcium titanium oxide.

4. The active material mixture of claim 1, wherein said additive material comprises calcium molybdenum oxide.

5. The active material mixture of claim 1, wherein said additive material comprises lithium cobalt oxide.

6. The active material mixture of claim 1, wherein the weight percentage of said additive material is between about 1% and about 10%.

7. The active material mixture of claim 1, wherein the weight percentage of said additive material is between about 2% and about 6%.

8. The active material mixture of claim 1, wherein the weight percentage of said additive material is about 3%.

9. A nickel positive electrode for use in an alkaline electrochemical cell, comprising:
   an active material mixture comprising:
      a nickel hydroxide material; and
      an additive material comprising at least one compound selected from the group consisting of calcium cobalt oxide, calcium titanium oxide, calcium molybdenum oxide, lithium cobalt oxide, and mixtures thereof.

10. The positive electrode of claim 9, wherein said additive material comprises calcium cobalt oxide.

11. The positive electrode of claim 9, wherein said additive material comprises calcium titanium oxide.

12. The positive electrode of claim 9, wherein said additive material comprises calcium molybdenum oxide.

13. The positive electrode of claim 9, wherein said additive material comprises lithium cobalt oxide.

14. The positive electrode of claim 9, wherein the weight percentage of said additive material is between about 1% and about 10%.

15. The positive electrode of claim 9, wherein the weight percentage of said additive material is between about 2% and about 6%.

16. The positive electrode of claim 9, wherein the weight percentage of said additive material is about 3%.

17. An alkaline electrochemical cell, comprising:
   at least one positive electrode;
   at least one negative electrode; and
   electrolyte;
   where said positive electrode comprises an active material mixture comprising:
      a nickel hydroxide material; and
      an additive material comprising at least one compound selected from the group consisting of calcium cobalt oxide, calcium titanium oxide, calcium molybdenum oxide, lithium cobalt oxide, and mixtures thereof.

18. The electrochemical cell of claim 17, wherein said additive material comprises calcium cobalt oxide.

19. The electrochemical cell of claim 17, wherein said additive material comprises calcium titanium oxide.

20. The electrochemical cell of claim 17, wherein said additive material comprises calcium molybdenum oxide.

21. The electrochemical cell of claim 17, wherein said additive material comprises lithium cobalt oxide.

22. The electrochemical cell of claim 17, wherein the weight percentage of said additive material is between about 1% and about 10%.

23. The electrochemical cell of claim 17, wherein the weight percentage of said additive material is between about 2% and about 6%.

24. The electrochemical cell of claim 17, wherein the weight percentage of said additive material is about 3%.

25. The electrochemical cell of claim 17, wherein said at least one negative electrode comprises a metal hydride active material.

26. The electrochemical cell of claim 17, wherein said at least one negative electrode comprises a cadmium active material.

* * * * *

UNITED STATES PATENT AND TRADEMARK OFFICE
CERTIFICATE OF CORRECTION

PATENT NO : 6,017,655
DATED : January 25, 2000
INVENTOR(S) : Stanford R. Ovshinsky, Srinivasan Venkatesan, Boyko Aladjov Subhash Dhar and Rosa Young It is certified that error appears in the above-identified patent and that said Letters Patent is hereby corrected as shown below:

Change title from "Nickel Hydroxide Positive Electrode Material Exhibiting Improved Conductivity And Engineered Activation Energy" to --Nickel Positive Electrode Having High Temperature Capacity--

Signed and Sealed this

Twentieth Day of March, 2001

Attest:

NICHOLAS P. GODICI

Attesting Officer

Acting Director of the United States Patent and Trademark Office